Oct. 16, 1923.

G. G. MUSTED 1,471,188

CLAMP

Filed Dec. 24, 1921

Inventor:—
George Gordon Musted.
by his Attorneys

Patented Oct. 16, 1923.

1,471,188

UNITED STATES PATENT OFFICE.

GEORGE GORDON MUSTED, OF GLASGOW, SCOTLAND.

CLAMP.

Application filed December 24, 1921. Serial No. 524,703.

*To all whom it may concern:*

Be it known that I, GEORGE GORDON MUSTED, a subject of the King of Great Britain and Ireland and the Isle of Man, residing at 721 Dumbarton Road, Partick, Glasgow, Scotland, have invented new and useful Clamps, of which the following is a specification.

This invention has reference to and comprises improvements in and relating to clamps and the like and particularly relates to that type of clamp used for flexible tubes and the like which consists of two hinged jaws provided with flanges or lugs adapted to be forced apart by means of a thumb or like screw so as to tighten the jaws on to the tube or the like.

The clamp is particularly suitable for tightening up or securing the end of a flexible tube on to the spigot end of a coupling for a pipe and is intended to take the place of the usual wire binding. It is also suitable for joining end to end flexible tubing and is also suitable for use in a temporary repair, that is, should a tube leak or burst it is only necessary to cover the leak with a suitable pad or plug and then to bind same with this clamp.

Flexible tubes, for use in connection with which this clamp is particularly suitable, are sometimes well worn, and distorted and it is difficult to get the jaws of the clamp tight enough to effectively close a leak.

The object of this invention is to overcome this difficulty and at the same time improve the construction of the clamp.

According to this invention the interior of the jaws are provided with a spring plate or plates which may consist of a blade spring pivoted or otherwise secured to the inside surface of the jaw. Or, if desired, the clamp jaws may be formed of material thin enough to have a spring-like action and have the parts of the jaws, which are cut to form the hinges and flanges or lugs, bent inwards to form the spring plates. The flanges or lugs of the one jaw, against which the end of the tightening screw operates, is preferably of hook-like shape, while a pivoted or hinged plate through which the tightening screw works may be of U like shape in section and embrace the flanges or lugs of the other jaw so that the screw is supported at two points and the liability of breakage is greatly reduced.

Alternately this hinged plate may be formed with a hook-like end adapted to embrace the one lug while the plate may be hinged to the other lug of the same jaw.

The center part of this plate may be bulged or bent for stiffening purposes and also to facilitate the fitting of the clamp on to the tube.

In order that others skilled in the art to which this invention relates may properly understand the same I have hereunto appended one sheet of explanatory drawings in which:—

Referring to these drawings:—

Figure 2:
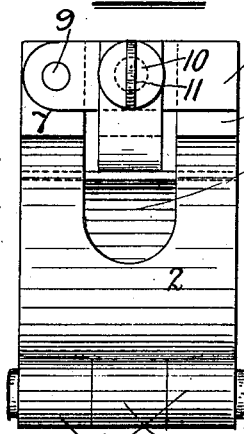
Figures 2 and 3 are elevations at right angles to Figure 1 and looking in opposite directions.
Figure 1:
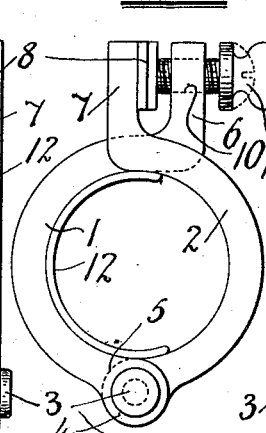
Figure 1 is an end elevation of a clamp as constructed according to this invention.
Figure 3:
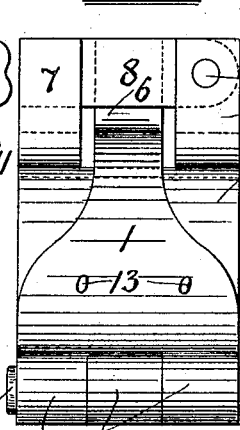
Figure 5:
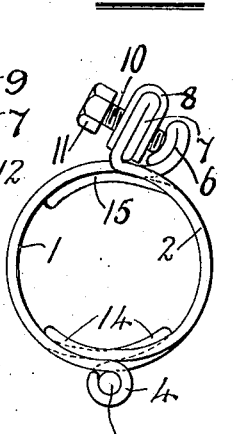
Figures 5, 6, 7 and 8 are similar views to Figures 1, 2, 3, and 4 of a clamp of slightly modified construction.
Figure 7:
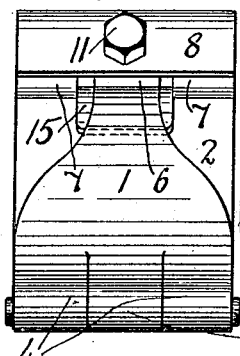
Figure 4:
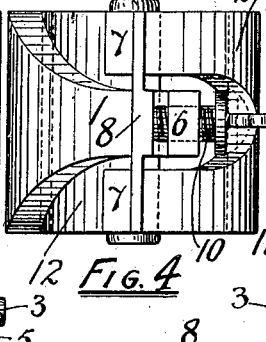
Figure 4 is a plan view.
Figure 6:
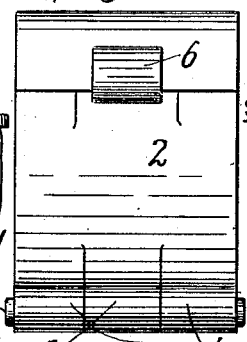
Figure 8:
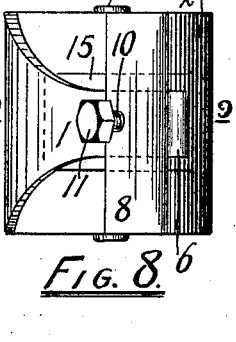
Figure 9:
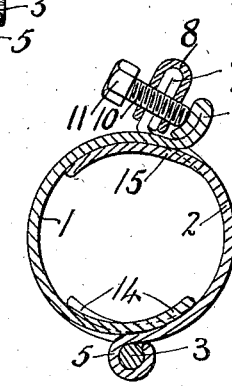
Figure 9 is a sectional elevation, the section being taken on the line 9—9 of Figure 8

In carrying the improvements of this invention into effect or practice, as illustrated by Figures 1 to 4, the clamp consists of two jaws 1 and 2, hinged together at one end by means of a hinge pin 3 which passes through eyes 4 and 5 formed on or fitted to the jaws 1 and 2. The free end of the clamp jaw 1 is provided with a flange or lug 6 arranged centrally while the corresponding end of the jaw 2 is provided with two flanges or lugs 7 arranged, one at each side, with a space between same. A plate 8 is hinged to one of the jaws 7 by being mounted on a pivot pin or the like 9.

A screw 10 formed with a suitable head 11 works through a screwed hole formed in the lug 6. When this clamp is mounted upon a flexible tube or the like the plate 8 lies between the lugs 6 and 7 with the end of the screw 10 bearing against same.

It will be readily understood that the clamp jaws 1 and 2 are tightened on to the tube by forcing apart, by means of the screw 10, the lugs 6 and 7.

In order that the tube may be gripped evenly and effectively, particularly when the tube is well worn or distorted, a spring or compensation plate 12 is secured to the inside surface of one of the jaws preferably by means of rivets 13.

To remove the clamp the screw 10 is run backwards then the plate 8 swung upwards on the pin 9. The jaws may then be opened; the jaw 6 passing between the jaw 7.

In the arrangement illustrated by Figures 5 to 9 the clamp is formed of material thin enough to have a spring like action. Each jaw 1 and 2 is formed from a rectangular plate bent into the form of a half circle. The one end of each jaw is formed with two cuts a suitable distance apart, preferably the distance apart of the cuts would be about one third of the length of the clamp. The material between the cuts on the one jaw 2 would be bent into the form of an eye 5 while the material on the outside of the cuts on the other jaw 1 would be bent into two eyes 4. A hinge pin 3 passes through these eyes 4 and 5. The material on the outside of the cuts of the one jaw 2 and the material between the cuts of the other jaw 1 would be bent inwards to form spring or compensation plates 14. If desired one or two of the three spring or compensation plates 14 may be dispensed with by cutting same away.

The free ends of both jaws are also formed with two similar cuts. The material between the cuts of the one jaw 2 would be bent inwards to form a spring or compensation plate 15 while the material on the outside of the cuts in the other jaw 1 may also be bent inwards to form two spring or compensation plates but preferably this material is cut away at a suitable angle as illustrated in the plan view, Figure 8. If desired the plate 15 may be dispensed with leaving the clamp with the plates 14 only or with the plates at the free end of the jaw 1 in addition to the plates 14.

The material on the outside of the cuts at the free end of the jaw 2 would be bent outwards to form two flanges or lugs 7 while the material between the cuts of the other jaw 1 would be bent outwards to form a lug 6.

Preferably these lugs 6 and 7 are strengthened by bending the material back upon itself. The lug 6 is preferably of hook-like shape. A plate 8, preferably of U shape in section is hinged to the one jaw 7 on a pivot pin 9 and embraces both jaws 7. The screw 10 works through screwed holes formed in both limbs of this U shaped plate 8.

Figure 10:
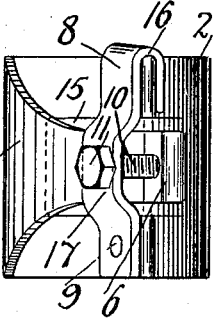
Figure 10 is a plan view of a clamp similar to that shown by Figures 5 to 9 but illustrates a slightly different form of hinged plate to which reference will, hereinafter, be more particularly made.

As illustrated by Figure 10 the plate 8 instead of being of U shape is formed with a hook-like end 16 adapted to embrace the one jaw 7 while it is hinged to the other jaw 7.

For stiffening purposes and also to facilitate the fitting of the clamp on to the tube the center portion 17 of the plate 8 through which the screw 10 passes may be of bent or bulged formation.

I claim:—

1. A clamp for flexible tubes and the like comprising two semicircular jaws hinged together at one end and having projecting lugs at the other ends, a plate pivoted to a lug of one of said jaws, a tightening screw carried by said plate and adapted in one position of the latter to engage a lug of the other jaw, said plate being movable to a position removing the screw from engagement with said lug, and a spring compensation plate formed integral with one jaw and extending inwardly of the other jaw.

2. A clamp for flexible tubes and the like composing two semicircular jaws, a portion at one end of each of said jaws being bent into an eye, a hinge pin adapted to pass through the said eyes to hinge the jaws together, and means at the free ends of the jaws for forcing the latter together, said jaws each having a portion at the hinged end adapted to lie inwardly of the other jaw to constitute a compensation plate.

3. A clamp for flexible tubes and the like comprisng two semicircular jaws hinged at one end, the remaining ends thereof being provided with lug portions adapted when separated to force said jaws together, each of said jaws having an extension adapted to lie inwardly of the opposite jaw to constitute spring compensation plates.

4. A clamp comprising two semicircular jaws hinged together at one end, the hinged end portions of said jaws being provided with extensions adapted to lie inwardly of the other jaw to constitute compensation plates, the remaining ends of said jaws being provided with projecting lugs, and means associated with said lugs for forcing said jaws together, said remaining ends also being provided with inwardly extending extensions constituting compensation plates.

5. A clamp for flexible tubes and the like comprising two semicircular jaws hinged together at one end and having projecting lugs at the other ends, a plate pivoted to a lug of one of said jaws and having a bulged center portion, and a tightening screw in said center portion adapted in one position of the plate to engage the lug of the other jaw and in another position of the plate to disengage the said lug to permit opening of the clamp.

6. A clamp for flexible tubes and the like comprising two semicircular jaws hinged together at one end and having projecting lugs at the other ends, a plate pivoted to a lug of one of said jaws and having a bulged center portion, and a tightening screw in said center portion adapted in one position of the plate to engage the lug of the other jaw and in another position of the plate to disengage the said lug to permit opening of the clamp, each of said jaws having an extension adapted to lie inwardly of the opposite jaw to constitute spring compensation plates.

GEORGE GORDON MUSTED.